United States Patent [19]

Thibault

[11] 4,353,329

[45] Oct. 12, 1982

[54] ROTARY SELF-FEEDER

[75] Inventor: Ronald M. Thibault, Osborne, Kans.

[73] Assignee: Osborne Industries, Inc., Osborne, Kans.

[21] Appl. No.: 169,797

[22] Filed: Jul. 17, 1980

[51] Int. Cl.³ .............................................. A01K 5/00
[52] U.S. Cl. ................................. 119/52 A; 119/53.5; 119/54
[58] Field of Search ................. 119/54, 53.5, 53, 52 A

[56] References Cited

U.S. PATENT DOCUMENTS

| 655,477 | 8/1900 | Combs | 119/53.5 |
| 980,496 | 1/1911 | Crockford | 119/53 |
| 1,025,225 | 5/1912 | Wilson | 119/53 |
| 1,096,703 | 5/1914 | Fleury | 119/53.5 |
| 1,194,053 | 8/1916 | Meyer | 119/54 |
| 1,392,004 | 9/1921 | Fouts | 119/53.5 |
| 1,879,247 | 9/1932 | Holliday | 119/54 |
| 2,533,538 | 12/1950 | Uhrenholdt | 119/54 |

FOREIGN PATENT DOCUMENTS

| 1127136 | 4/1962 | Fed. Rep. of Germany | 119/54 |
| 202191 | 6/1923 | United Kingdom | 119/54 |
| 737101 | 9/1955 | United Kingdom | 119/53.5 |

Primary Examiner—Jay N. Eskovitz
Attorney, Agent, or Firm—Litman, Day and McMahon

[57] ABSTRACT

A self feeder for livestock is provided which comprises a base member having a surface for receiving feed thereon and a hopper positioned thereabove. The hopper is adapted for containing feed therein and has a bottom with an aperture for allowing feed to flow therethrough and into said base member receptacle. A plurality of hopper support members are each connected respectively to the base member and the hopper and are also adapted for separating feeding animals. A feed wheel rotatably mounted in the receptacle includes an upright member rotatably mounted in the receptacle. The upright member extends through the hopper bottom aperture with upper and lower portions respectively above and below the level of the hopper bottom. An agitating rod extends from the upright member upper portion for agitating feed within the hopper as the feed wheel is rotated. The feed wheel lower portion includes a spoke extending from the upright member which is movable by an animal to rotate the feed wheel. The spoke is also adapted for engaging a quantity of feed in the receptacle whereby rotation of the feed wheel is resisted.

12 Claims, 9 Drawing Figures

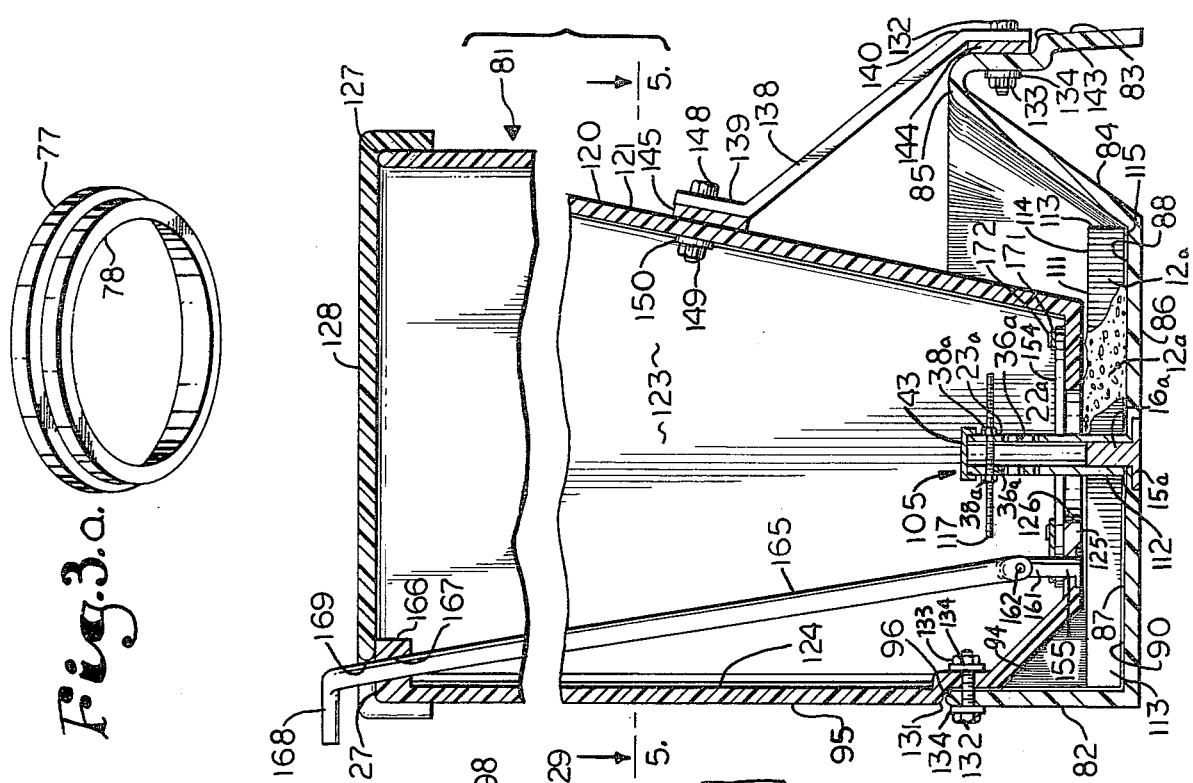

ROTARY SELF-FEEDER

BACKGROUND OF THE INVENTION

This invention relates to livestock feeders and in particular to a rotary self-feeder.

Self-feeders for livestock are well known in the field of animal husbandry and a variety of different designs have been developed in an attempt to achieve optimum feeding conditions for different types of livestock. Several of these prior art structures include means to agitate the feed material to facilitate the flow thereof. One type of self-feeder for livestock which is illustrated in the Lydon U.S. Pat. No. 1,695,597 includes a feed agitator with a chain having spaced bars thereon which is actuated by a triangular member in response to engagement by a hog. Another type of feeder is shown in the Casper U.S. Pat. No. 2,153,455 which shows a hopper for containing feed and a wheel including a plurality of spokes, both being rotatable with respect to a shaft having agitators mounted thereon. Bars are arranged peripherally around the top of the wheel and extend to the hopper to define compartments. Doty, U.S. Pat. No. 3,951,107 illustrates a linear type livestock feeder with a front partition adapted for agitating feed when abutted by an animal. The front partition is adjustable to vary the amount of feed delivered to the feeding trough.

Prior art self-feeders, however, tend to be either complex in structure or in manufacture, or wasteful of feed and inefficient in use, resulting in a relatively high cost to the user. Particularly in feeders having agitator means, a self-regulating feature is needed to prevent the animals from overfilling the feeding area or playing and rooting in the feed.

SUMMARY OF THE INVENTION

In the practice of the present invention, a self-feeder for livestock is provided which is both simple in manufacture and efficient in dispensing feed to livestock therefrom. A base member includes side walls and a bottom having a surface for receiving feed thereon. A hopper for containing feed has a bottom with an aperture therein positioned above the base member bottom whereby feed flowing through the hopper bottom aperture is received on the base member bottom surface. A feed wheel includes an agitator rod extending from an upper portion of an upright member within the hopper and at least one spoke extending from a lower portion of the upright member above the feed receiving surface. Reliability in dispensing feed is provided by the agitator rod breaking up feed within the hopper and thereby facilitating its flow through the hopper bottom aperture. As the base member fills with feed, turning the spoke by an animal becomes increasingly difficult because of the resistance to movement afforded by feed on the base member bottom surface. Therefore, animals utilizing the feeder are discouraged from playing with the feed wheel and consequently wasting feed material. As the feed is consumed, the feed wheel offers less resistance to movement and additional quantities of feed to replace that consumed may then be more easily dispensed. Another feature of the invention relating to its efficiency is the "feedback" action of the spoke whereby if the base member is already full, further rotation of the feed wheel takes grain back between the base member bottom surface and the hopper bottom which feed serves to block flow of additional feed from the hopper aperture. Thereby waste and stagnation of the feed material is prevented.

OBJECTS OF THE INVENTION

The principal objects of the present invention are: to provide a self-feeder for livestock which prevents the wasting of feed material; to provide such a self-feeder wherein feed is dispensed in response to movement of a part thereof by an animal; to provide such a self-feeder wherein additional feed flow is resisted until feed accessible by animals is consumed; to provide such a self-feeder for livestock which includes a hopper with means therein to agitate feed material and facilitate the flow thereof; to provide such an apparatus wherein said agitator means may be operated by an animal feeding thereat; to provide such a self-feeder which includes a feed wheel rotatable by an animal and having an agitator rod extending therefrom positioned within the hopper and a spoke engageable by an animal and resisting rotation of the feed wheel in response to engagement with feed material; to provide such an apparatus wherein the spoke propels residual feed material under an aperture in the hopper and whereby further flow is restricted until such feed is consumed; to provide such a device wherein the rate of feed flow is adjustable according to the position of the hopper with respect to the base member; to provide such a self-feeder for livestock which includes means to adjust the size of the hopper aperture and thereby vary the rate of feed flow; to provide such a self-feeder adaptable for use with a single hopper aperture and feed wheel or with a plurality of hopper apertures and corresponding feed wheels; to provide such a self-feeder which includes members supporting the hopper above the receptacle whereby a plurality of feeding spaces for animals is provided and interference therebetween is avoided; to provide such a self-feeder wherein a one piece fabrication or a two piece fabrication of the same or different materials may be utilized to construct the base member and hopper; to provide such a self-feeder which is economical to manufacture, efficient in use, capable of a long operating life and particularly well adapted for the proposed use.

Other objects and advantages of this invention will become apparent from the following description taken in conjunction with the accompanying drawings, wherein are set forth by way of illustration and example certain embodiments of this invention.

The drawings constitute a part of this specification and include exemplary embodiments of the present invention and illustrate various objects and features thereof.

BRIEF DESCRIPTION OF THE DRAWINGS

FIG. 3a is an enlarged perspective view of a flow restricting ring for reducing the effective size of a bottom aperture in the hopper.

FIG. 6 is an enlarged fragmentary perspective view of a base member of the first modified self-feeder and particularly showing feed receptacles and the feed wheels rotatably mounted thereon.

FIG. 7 is an enlarged fragmentary vertical cross-sectional view of the first modified self-feeder.

FIG. 8 is a partial side elevational view of a second modified self-feeder having two sets of aligned feeding stations with corresponding feed wheels on opposite sides of the feeder and having a portion broken away to better illustrate detail thereof.

DESCRIPTION OF THE PREFERRED EMBODIMENTS

Figure 1:
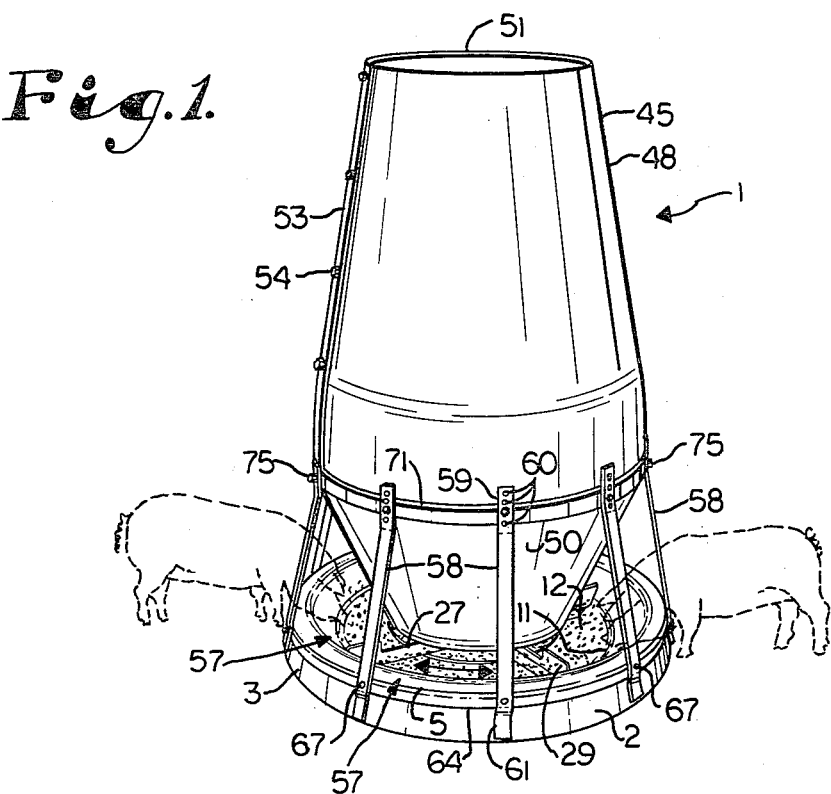
FIG. 1 is a perspective view of a rotary self-feeder for livestock embodying this invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally indicates a rotary self-feeder embodying this invention which is illustrated in FIGS. 1 through 3 and 3a. The self-feeder 1 comprises a circular base member 2 with a circular outer side wall 3 defining the periphery of the base member 2. An inner side wall 4 is concentric with and integrally connected to the outer side wall 3 and demarcated therefrom by an upper edge 5. A base member bottom 6 is integrally connected to the inner side wall 4 and has an upper surface 7. The base member surface 7 includes a circular outer portion 9 positioned between the inner side wall 4 and a raised circular inner portion 8. A generally concave receptacle 11 is defined by the inner surface of the side wall 4 and the upper surface of the base member bottom 6 and is adapted for receiving a quantity of feed material 12 therein. It is anticipated that a variety of bulk feed materials having different flow characteristics and angles of repose may be successfully utilized with this invention.

Figure 2:
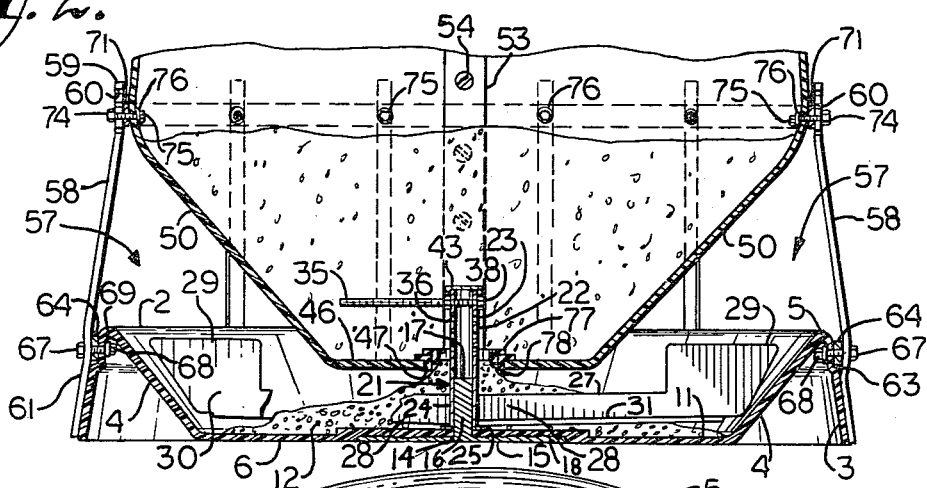
FIG. 2 is an enlarged fragmentary vertical cross-sectional view of the feeder, showing a hopper, a base member and a feed wheel.
Figure 3:
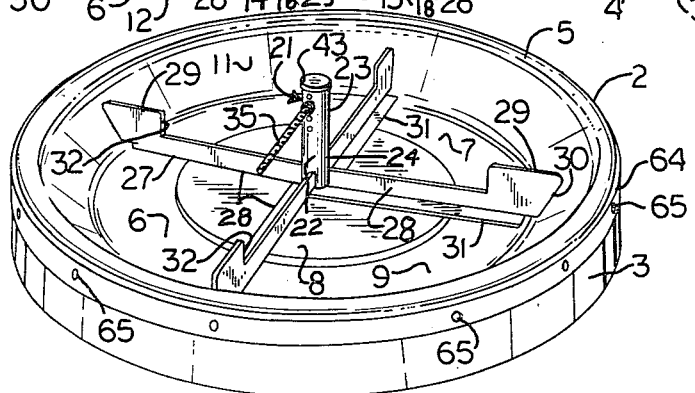
FIG. 3 is an enlarged fragmentary perspective view of the base member showing the feed wheel rotatably mounted therein.

An axle structure 14 includes an axle base 15 suitably attached within a recess 18 in the base member bottom 6. An axle shaft 16 extends upwardly from the axle base 15 and terminates in an upper end 17 (FIG. 2). As best seen in FIG. 3, a feed wheel 21 is rotatably mounted on the axle structure 14. The feed wheel 21 includes an upright member 22 having a generally cylindrical hollow configuration and which is slidably and rotatably positioned over the axle shaft 16, as is best seen in FIG. 2. The upright member 22 includes an upper portion 23 and a lower portion 24.

As is shown in FIG. 3, four spokes 27 extend radially outwardly from the lower portion 24 of the feed wheel upright member 22. Each of the spokes 27 has a distal portion 29 extending outwardly from an inner portion 28 and terminating in a distal portion outer end 30.

The distal portions 29 of respective spokes 27 are of greater height than the respective inner portions 28 and display an inner edge 32. A flange 31 extends generally parallel to the base member bottom 6 from each of the spokes 27.

Agitator means, such as agitator 35, is associated with the feed wheel 21. The rod-like agitator 35 is positioned within apertures 36 in the upright member upper portion 23 and extends in a generally perpendicular manner therefrom. The agitator 35, as is shown in FIG. 3, is a threaded rod and is retained within the upright member apertures 36 by suitable nuts 38. A washer 25 is fitted over the axle shaft 16 and provides a bearing between the base member bottom 6 and the feed wheel upright member 22 whereby the feed wheel 21 is allowed to freely rotate with respect to the base member 2. A cap 43 is attached to the upper portion of the upright member 22 to prevent excessive amounts of feed material 12 from entering the feed wheel upright member 22.

Feed delivery or storage means such as the illustrated hopper 45 adapted for containing feed therein includes a bottom 46 with an aperture 47 therethrough. As illustrated in FIG. 2, the feed wheel upright member 22 extends through the hopper aperture 47 whereby the upright member upper and lower portions 23 and 24 are respectively above and below the level of the hopper bottom 46. The hopper bottom aperture 47 is adapted for allowing feed to flow therethrough and into said receptacle 11.

The hopper 45 also comprises an upper portion 48, a middle portion 49 and a lower portion 50. The lower portion 50 has substantially an inverted frusto-conical configuration to facilitate the flow of feed material to said hopper bottom 46 and into said receptacle 11 and also to allow easy access to the feed material 12 by animals feeding at the self-feeder 1. The hopper 45 has a top opening 51 for the introduction of feed material thereinto. In the present illustrated embodiment, the hopper 45 is fabricated as two symmetrical halves joined along seams 53 and secured together by suitable fasteners 54.

A plurality of feeding stations 57 are defined by support members 58 adapted for supporting the hopper 45 on the base member 2. Each support member 58 comprises an upper end 59 with a plurality of apertures 60 therein and a lower end 61. A shoulder 63 is defined on the base member outer side wall 3 adjacent the upper edge 5. A base member connecting band 64 having a plurality of apertures 65 therein rests on the base member shoulder 63. Each of the support member lower ends 61 is secured to the base member 2 by suitable fastening means such as a bolt 67 at respective aligned apertures in the support member lower end 61 and the base member shoulder 63. Each bolt 67 has a corresponding nut 68 and washer 69 secured thereto between the base member outer and inner side walls 3 and 4 respectively. Each support member upper end 59 is secured to said hopper connecting band 71 and said hopper middle portion 49 by a bolt 74 extending through a support member aperture 60 and aligned apertures (not shown) in the hopper connecting band 71 and a middle portion of the hopper 49. Each bolt 74 has a respective nut 75 and washer 76 attached thereto.

In operation, a quantity of feed material 12 is first deposited within the hopper 45 through the top opening 51 thereof. The feed 12 then flows by gravity, facilitated by the inverted frusto-conical configuration of the hopper lower portion 50, through the aperture 47 in the hopper bottom 46 and into the receptacle 11. The feed material 12 unless disturbed or agitated generally continues to flow through the aperture 47 onto the base member surface 7 until the angle of repose of the feed material is reached with respect to the angle of the surface of the feed between the surface 7 and the edge of the aperture 47. As used herein, the term "angle of repose" means the maximum angle with respect to the horizontal at which material will substantially cease tumbling or sliding down the side of a pile thereof at which point a semi-steady state is achieved. When sufficient feed material 12 has been deposited on the base member surface 7 such that the angle of repose thereof is reached, further feed flow from the hopper 45 will cease. The resulting pile will naturally tend to resemble a truncated cone with its greatest height at the center around the feed wheel upright member 22. Such feed material 12 which automatically accumulates in the receptacle 11 tends to remain on the inner portion 8 of the base member surface 7 and is not normally accessible by an animal until it is dispersed by the feed wheel 21 to the surface outer portion 9.

It is desirable that this feed material be distributed more evenly over the base member surface 7 for greater accessibility while, at the same time, it is desirable to avoid overfilling the trough with the resultant contamination and waste of feed material 12. Accordingly, the feed wheel 21 of the present invention operates to regulate the flow of feed from the hopper 45 into the feed receptacle 11, and also to distribute the feed material 12 on the base member surface 7.

Swine are well known to possess both agressive feeding habits and a certain amount of intelligence. Accordingly, the self-regulating features of the present feeder are intended to be operated by animals and particularly by pigs. Feeding pigs quickly learn that by manipulating the spoke distal portions 29 with their snouts, feed will be caused to flow into the receptacle 11 and be propelled to the outer portion 9 of the surface 7 where it is easily accessible. Movement of a spoke 27 rotates the feed wheel 21 and agitates feed material 12 within the hopper 45 by movement of the agitator 35 which serves to break up clumps of feed material 12 and facilitate the flow thereof through the aperture 47. As the agitator 35 facilitates the feed flow, the spokes 27 tend to distribute feed material 12 over the receptacle surface 7. Feed 12 is thereby urged from under the aperture 47 thus lowering the surface angle with respect to the horizontal of the feed material below the angle of repose thereof and allowing additional flow from the hopper 45.

Rooting pigs, having learned how to operate a self-feeder, tend to play therewith and to continue manipulating such a feeder until they have more feed than they can eat or until the supply is exhausted. Also, with ample feed supply available, pigs tend to cast it about with their snouts into other feeding stations 57 and out of the receptacle 11, resulting in waste through spoilage or contamination. Self-regulation of the feed flow is provided by resistance means which in the present embodiment comprise the feed wheel 21 which becomes increasingly difficult to rotate in general proportion to the filling of the receptacle 11 with feed material 12. As feed material 12 accumulates and is distributed over the base member surface 7, it tends to bury the spokes 27. A pig must therefore push ever increasing amounts of feed material 12 with his snout in order to rotate the feed wheel 21. To further increase the resistance of the feed wheel to turning, additional agitators 35 may be placed within the apertures 36 on the upright member 22. While increasing agitation action within the hopper 45, a plurality of agitators 35 will also tend to resist rotation of the feed wheel 21.

Feed flow is further regulated by a "feed back" action of the individual spokes 27. This "feed back" action tends to counteract the radial dispersion of feed material 12 caused by rotation of the feed wheel 21. In particular when the surface 7 has a substantial quantity of feed material 12 thereon, as the feed wheel 21 rotates, the feed material 12 on the surface outer portion 9 is collected by the distal portion 29 and tends to seek the lowest point along the spoke 27 to pass or flow over. A residual uneaten portion of the feed material 12 thereby preferentially spills over each spoke 27 along the upper edge thereof in the region inward of the distal portion inner edge 32 and onto the surface inner portion 8 between the surface 7 and the hopper bottom 46 such as to be engaged by the next spoke 27. This "feed back" action typically occurs only when there is sufficient feed material 12 on the surface to overflow the spokes 27 when the feed wheel 21 is rotated. Such residual feed swept back by the spoke distal portions 29 tends to fill the space under the hopper aperture 47 and restricts additional feed material 12 from flowing from the hopper 45. A feeding animal is therefore urged to consume the available feed material 12 on the surface outer portion 9 as further rotation or the feed wheel 21 will merely sweep the feed material 12 present with considerable resistance to rotation, until sufficient feed material 12 is eaten or removed from the receptacle 11 to allow free flow thereof from the hopper 45.

The rate of feed flow from the hopper 45 to the receptacle 11 may be adjusted to accomodate different types of feed having various flowability characteristics and different angles of repose. For example, the hopper 45 may be adjusted vertically with respect to the base member 2 by altering which of the support member apertures 60 are utilized for bolting the support members 58 to the hopper 45. Raising the hopper 45 will increase feed flow because given an equivalent angle of repose, a larger quantity of feed material 12 can accumulate beneath the aperture 47. The hopper 45 may be lowered to achieve the opposite affect. As illustrated in FIG. 2, selective means such as the illustrated plurality of flow restricting rings 77 may be positioned within the aperture 47. Each ring (FIG. 3a) has a flange 78 extending downwardly therefrom adapted for retaining a respective ring either within the hopper bottom aperture 47 or another flow restricting ring 77 of the next larger size, thus effectively varying the size of the aperture 47 and changing the size of the pile of feed material 12 which will accumulate therebeneath. The feed flow rate may thus be increased or decreased in proportion to the effective opening around the upright member 22.

By sufficiently increasing the accumulated quantity of feed material 12 according to one of these methods, accessibility may be had by an animal even without moving the feed wheel 21. Less aggressive animals may therefore by encouraged to use the feeder 1. Also, a greater automatic flow may be desired until the animals become accustomed to manipulating the feed wheel 21, after which time the hopper 45 may be lowered or the aperture 47 restricted to increase the effectiveness of the self-regulating features of the present invention.

Interference among feeding pigs is also quite common, with larger and more dominant animals attempting to prevent others from feeding regardless of the feed quantity available. The plurality of circumferentially arranged support members 58 accordingly retain individual pigs within respective feeding stations 57. The support members 58 also discourage routing where pigs use their snouts to fling feed material 12 from the feeder 1 with resultant contamination and waste.

A linear or "fence line" self-feeder embodying this invention is generally designated by the reference numeral 81 and is illustrated in FIGS. 4 through 7. Similar parts to those of the previously described rotary self-feeder 1 are designated by the same corresponding reference numerals except for the addition of the suffix "a" to the numerals of the modified linear feeder 81.

A base member 82 includes an outer front wall 83 integrally connected to a bevelled inner front wall 84 and demarcated therefrom by an upper edge 85. The base member 82 has a bottom 86 having an upper surface 87 with a front portion 88 and a back portion 89. A base member back wall 95 exhibits an upper edge 96 and a plurality of apertures 97 therethrough. A receptacle 93 is defined above the surface 87 and the front walls 84 and back wall 95. The receptacle 93 is partly subdivided by a plurality of arcuate shaped side walls 94, as is shown in FIG. 6. The side walls 94 do not extend between the front wall 84 and back wall 95 but have a sloping end 98. A plurality of axle structures 14a are mounted in the receptacle 93 each having an axle base 15a secured in the base member 86 and an axle shaft 16a integrally connected thereto and extending upwardly from the base member surface 87.

Feed wheels 105 each include respective upright members 22a with upper and lower portions 23a and 24a respectively. Five spokes 111 extend generally perpendicular from and are connected to the lower portion 24a of each upright member 22a at respective inner ends 112. The spokes 111 are generally parallel to the surface 87 and somewhat spaced therefrom. Each spoke 111 also has an outer end 113 and top and bottom edges 114 and 115 respectively. Agitators 117 comprise threaded rods secured within apertures 36a by suitable nuts 38a and extend from respective upright upper portions 23a generally perpendicular to the upright member 22a.

Figure 4:
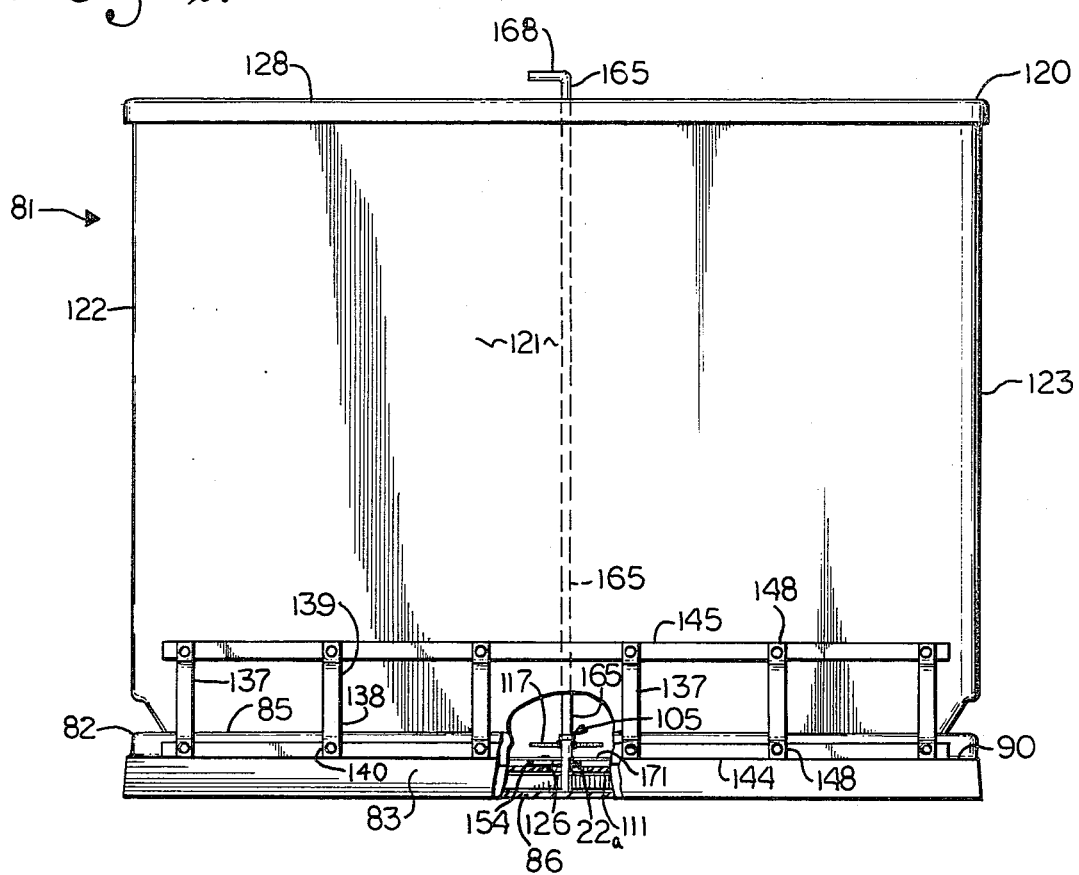
FIG. 4 is a front elevational view showing a first modified self-feeder construction including a plurality of feeding stations with corresponding feed wheels and with a portion broken away to better illustrate the construction thereof.

A hopper 120 exhibits a front 121, as is seen in FIG. 4, left and right sides 122 and 123 respectively, and a back 124. A hopper bottom 125 has a plurality of generally linearly, aligned apertures 126 positioned over the back portion 89 of the base member surface 87. The feed wheel upright members 22a extend through respective hopper bottom apertures 126 and the upper and lower portions 23a and 24a thereof are respectively positioned above and below the level of the hopper bottom 125. The hopper 120 is provided with an upper edge 127 and a cover 128 adapted for fitting thereover and protecting the contents of the hopper 120. When the hopper 120 is attached to the base member 82 (FIG. 7), a plurality of partly open enclosures 129 are formed by the back portion 89 of the base member surface 87, the hopper bottom 125, and respective side walls 94. The enclosures 129 are open between the ends 98 of respective side walls 94. The spokes 111 of the feed wheels 105 are selectively rotated within respective enclosures 129 and feed flows into each enclosure 129 from a respective hopper bottom aperture 126.

A shoulder 131 is defined along the hopper back 124 and adapted for receiving the receptacle back wall upper edge 96. Bolts 132 are positioned within receptacle back wall apertures 97 and corresponding apertures on the hopper back 124 and retained by suitable nuts 133 and washers 134. A plurality of feeding stations 137 are defined along the front of the linear feeder 81 by support members 138. Each feeding station 137 is positioned in front of and communicates with a respective enclosure 129. Each support member 138 has an upper and lower end 139 and 140 respectively. A shoulder 143 is along the base member outer front wall 83 and is adapted for receiving a base connecting band 144. A hopper connecting band 145 extends along the front 121 thereof. Bolts 148 pass through apertures (not shown) in the upper and lower ends 139 and 140 respectively of each support member 138, through aligned apertures (not shown) in the base and hopper connecting bands 144 and 145 respectively, and also through the hopper front 121 and shoulder 143 respectively. The bolts 148 are retained by suitable nuts 149 and washers 150, as shown in FIG. 7.

Figure 5:
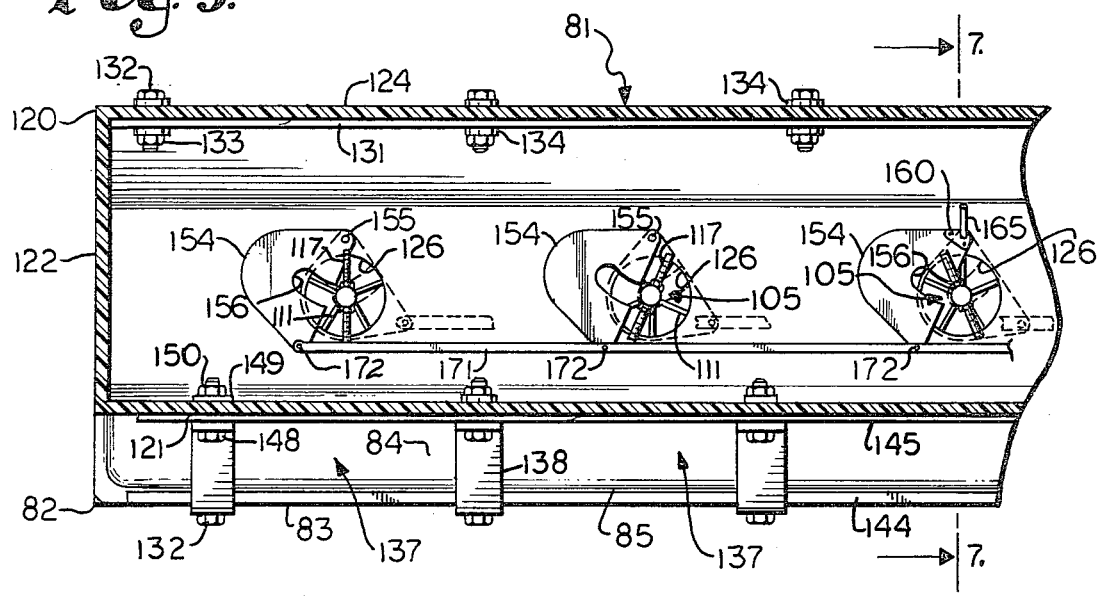
FIG. 5 is an enlarged fragmentary horizontal cross-sectional view of the first modified self-feeder construction taken along line 5—5 in FIG. 7 and particularly showing an apparatus for adjusting the size of apertures between a hopper and the feeding stations.

Rate of feed flow between hopper 120 and surface 87 in the linear self-feeder 81 is in part regulated by a plurality of plates 154 (see FIG. 5) pivotally attached to the hopper bottom 125 by suitable connectors 155. Each plate 154 includes a respective notch 156 adapted for receiving a respective upright member 22a therein when the apertures 126 are covered thereby, as shown in phantom in FIG. 5. The center plate 154, third from the left as seen in FIG. 5, includes a connector 160 and a post 161, whereby rotation of the post 161 will cause the center plate 154 to slide on the hopper bottom 125 such that a respective aperture 126 may be selectively covered and uncovered. A control rod 165 extends upwardly from a pivotal connector 162 on the post 161 through a bearing member 166 formed on the hopper back 124 adjacent the top edge 127. Above the cover member 128, the control rod 165 is bent to form a handle portion 168. The cover member 128 has a suitable notch 169 adapted for allowing the control rod 165 to extend therethrough. A rigid plate link rod 171 is secured to each plate 154 by suitable pivotal connectors 172. When a torque force is applied to the control rod 165 by means of the handle 168, all of the plates 154 slide concurrently with respect to the hopper bottom 125 to adjust the effective sizes of the hopper bottom apertures 126.

In operation, feed 12a flows from the hopper 120 to the surface 87 as in the previous embodiment. Then the spokes 111 propel feed 12a from the respective enclosures 129 onto the front portion 88 of the base member bottom surface 87 as animals rotate respective feed wheels 105. The spoke outer ends 113, top edges 114 and bottom edges 115 are respectively near or adjacent but normally slightly spaced from the side walls 94, hopper bottom 125 and back portion 39 of the base member surface 87 portions of the rotational paths of the spokes 111. Substantially the lower portion of the entire areas of the enclosures 129 are thereby swept as the feed wheels 105 rotate and residual feed is not allowed to accumulate and to spoil therein and become contaminated. In addition, spontaneous feed flow out of the enclosures 129 while the spokes 111 are stationary is decreased relative to the previous embodiment and dependence on rotation of the feed wheel 105 for feed flow is thereby increased.

As with the rotary self-feeder 1, feeding pigs or the like learn to push the spoke distal portions 113 with their snout for more feed material 12a until the spokes 111 become buried and are therefore difficult to push. In this manner animals are urged to eat what is on the surface 87 before rotating the feed wheel 105 again. In addition, the animals are urged not to play with the mechanism of the feeder 81 such that excessive feed material 12a is placed on the surface 87.

The feed wheels 105 and respective apertures 126 need not be concentric and, in fact, positioning the upright members 22a within a forward portion of the respective apertures 126 diverts most of the feed flow from the hopper bottom apertures 126 behind the upright members 22a and further prevents spontaneous flow from the hopper 120 onto the surface front portion 88. Feeding animals thus cannot maintain a sufficient spontaneous feed flow by gravity and are urged to rotate the feed wheels 105 to sweep feed from the enclosure 129 to an accessible position. "Feed back" as the spokes 111 are rotated in residual or non eaten feed on the surface front portion 88 into the enclosures 129 also tends to prevent spontaneous flow through the apertures 126. The quantity of feed available on the surface 87 is thereby partly regulated or restricted and waste and overfilling prevented.

The feeding stations 137 each correspond to a respective feed wheel 105 and enclosure 129 and are demarcated on either side by support members 138. The linear or "fence line" feeder thus allows individual animals to operate feed wheels 105 independently of each other while separated by the upright members 138.

A two-sided "fence line" feeder being a second modified embodiment of this invention is illustrated in FIG. 8 and is generally designated by the reference numeral 181. The two-sided feeder generally comprises two one-sided linear feeders such as the previously just discussed embodiment placed back-to-back, therefore, similar elements appearing in FIG. 8 and FIGS. 4 through 7 respectively are designated by the same reference numeral except for the addition of the subscript "b" to the reference numerals designating the parts of the two-sided feeder 181. A base member 182, a hopper 183, and a cover 184 may be respectively fabricated as a one piece unit or, alternatively, each may comprise severed separate components. Support means 138b maintain a selected positioning of the hopper 183 relative to the base member 182 and define a plurality of feeding stations 137b on either side of the feeder 181. Control rod handles 168b are shown protruding from the cover 184 above hopper fronts 121b. In use the second modified feeder 181 functions in a manner similar to the previously discussed feeder 81.

A variety of other configurations are also anticipated as being adaptable for use with the present invention. For example, a plurality of feeding stations with respective feed wheels similar to those designated 105 may be arranged in a circle or an oval around a central hopper from which their feed supply is derived.

The feeders shown embodying this invention may be fabricated from a variety of different materials, for example, fiberglass reinforced plastic, steel, sheet metal, or wood or any combinations thereof. Different size animals, such as pigs of different ages, may be accommodated by feeders as shown by varying certain dimensions, particularly those of the hoppers and feed receptacles and the relative positioning therebetween. Although four and five spoke feed wheels are illustrated, feed wheels with fewer or more spokes may be employed.

It is to be understood that while certain forms of this invention have been illustrated and described, it is not to be limited thereto except insofar as such limitations are included in the following claims.

What is claimed and desired to secure by Letters Patent is:

1. A self feeder mechanism for distributing feed to livestock comprising:
   (a) a base member having a surface adapted to receive feed and a generally circular wall extending upward from said surface;
   (b) a feed wheel being rotatable with respect to said base member surface and being adapted for engagement and movement by an animal; and
   (c) said feed wheel including a radially extending spoke thereon; said spoke having a radially outward portion and a radially inward portion; said spoke outward portion having an upper surface extending above the entire length of the upper surface of said inner portion thereof; said spoke outward portion having a distal end being relatively closely spaced with respect to said circular wall;
   (d) whereby when the feed is positioned on said surface, the feed will be urged outwardly by rotation of said feed wheel until the feed reaches a sufficient level to spill over said spoke whereupon said feed will selectively spill over said spoke inner portion as opposed to said outer portion thereby urging such spilling feed radially inward.

2. The mechanism according to claim 1 including:
   (a) a hopper connected to said base member and spaced above said surface; said hopper adapted for containing the feed and including a bottom aperture adapted to dispense the feed from within the hopper onto said surface.

3. The mechanism according to claim 2 wherein:
   (a) said aperture is generally vertically located over a radialy central portion of such surface; and
   (b) said aperture is spaced from said surface such that the feed will flow therethrough prior to rotation of said feed wheel onto said surface until the feed accumulates on said surface to the extent necessary to reach the angle of repose of the feed;
   (c) whereby upon rotation of said feed wheel the feed on said surface will be urged outwardly such that additional feed will flow through said aperture until the feed spills over said spokes whereupon the feed will be urged radially inward so as to prevent further flow of feed through said aperture.

4. The mechanism according to claim 1 wherein:
   (a) said surface is generally horizontal.

5. The mechanism according to claim 4 wherein:
   (a) said surface includes an inner portion closely spaced with relation to said spoke and an outer portion spaced apart from said spoke such that feed is urged into said surface outer portion.

6. The mechanism according to claim 4 wherein:
   (a) said spoke has a lower edge generally parallel to and adjacent to said surface inner portion.

7. A self feeder mechanism for distributing feed to livestock comprising:
   (a) a base member having a feed receiving surface and arcuate side and rear walls upwardly extending from said surface;
   (b) a feed wheel being rotatable above said base member surface and being adapted for engagement and movement by an animal;
   (c) said feed wheel includes a radially extending spoke;
   (d) a feed storage hopper having a bottom; and hopper bottom generally engaging said feed surface side and rear walls and being vertically spaced above said surface and said feed wheel; said hopper including distribution means adapted to allow feed within said hopper to flow onto said surface; said storage hopper bottom, said base member feed receiving surface and said base member side and rear walls defining an enclosure therebetween; said enclosure being open opposite said base member rear wall to allow livestock access thereto; and (e) said spoke rotatable within said enclosure; said spoke having a top edge, distal edge and bottom edge which pass in closely spaced relationship to said hopper bottom, said base member side and rear walls, and said base member feed receiving surface respectively during rotation such that said spoke sweeps substantially all of said enclosure during the rotation thereof;

(f) whereby, when feed collects on said feed receiving surface, said feed wheel requires increasing force to rotate same in general proportion to the amount of feed said spoke engages and said spoke tends to sweep feed along said surface to the rear side of said feed mechanism as feed collects on surface so as to tend to block flow of feed from said hopper to said surface.

8. The mechanism according to claim 7 wherein:
(a) said distribution means comprises an aperture within said hopper bottom; and
(b) said feed wheel includes an upright member generally perpendicular to said spoke and coaxial with the rotation of said spoke; said upright member extending upward through the aperture in said hopper bottom.

9. The mechanism according to claim 8 wherein:
(a) said upright member is non-concentrically aligned with said aperture being positioned away from said surface rear wall such that said feed is urged toward a side of said feed receiving surface associated with said rear wall.

10. A feeder mechanism for distributing feed to livestock comprising:
(a) a base member having a feed receiving surface; said feed receiving surface having a generally planar central portion and said base member including an arcuate side wall extending upwardly from said feed receiving surface;
(b) a hopper for storing the feed having a bottom aperture for dispensing the feed onto said surface; said hopper bottom aperture being spaced sufficiently close to said base member surface such that the natural angle of repose associated with the feed prevents the feed from covering the entire base member surface unless agitated thereon;
(c) a feed wheel rotatably mounted on said base and positioned above said surface; said wheel including:
  (1) an upright member rotatable about an axis generally perpendicular to said surface central portion; and
  (2) a spoke extending generally perpendicularly and radially outwardly from said upright member; said spoke having a lower edge; a portion of said spoke lower edge being adapted to sweep generally adjacent said base member central portion such that substantially all feed on said base member central portion is urged radially outwardly by rotation of said spoke;
  (3) said spoke having a distal end which sweeps adjacent to said base member side wall such that said spoke is adapted to urge feed away from said surface central portion until feed accumulates on said surface such that the feed spills over said spoke on rotation thereof.

11. The mechanism according to claim 10 wherein:
(a) said spoke includes a radially outer section and a radially inner section; said spoke outer section having an upper edge vertically spaced above an upper edge of said spoke inner section, whereby feed upon accumulation first spills over said inner section upper edge whereby feed is urged toward said surface central position to retard further flow of feed from said hopper to said surface.

12. The mechanism according to claims 11 wherein:
(a) said feed wheel upright member extends upward through said hopper bottom aperture and includes agitation means near a distal end thereof to agitate feed within said hopper.

* * * * *